(No Model.)
W. P. NEGUS.
WIRE STRETCHER.
No. 513,816. Patented Jan. 30, 1894.
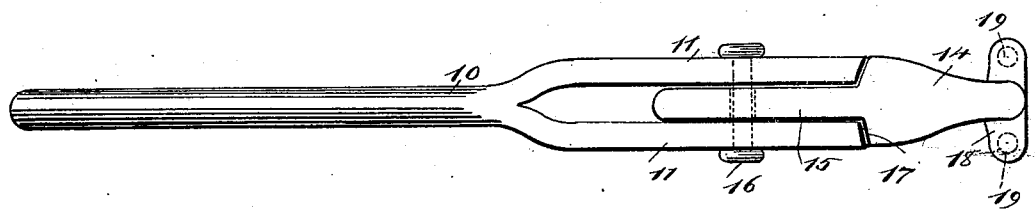
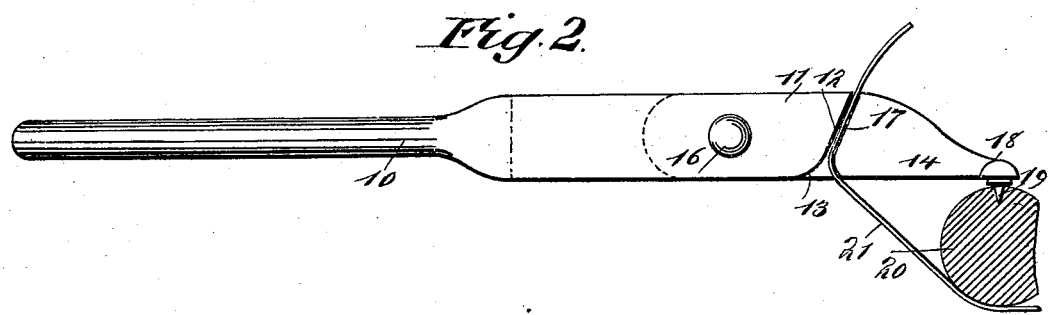
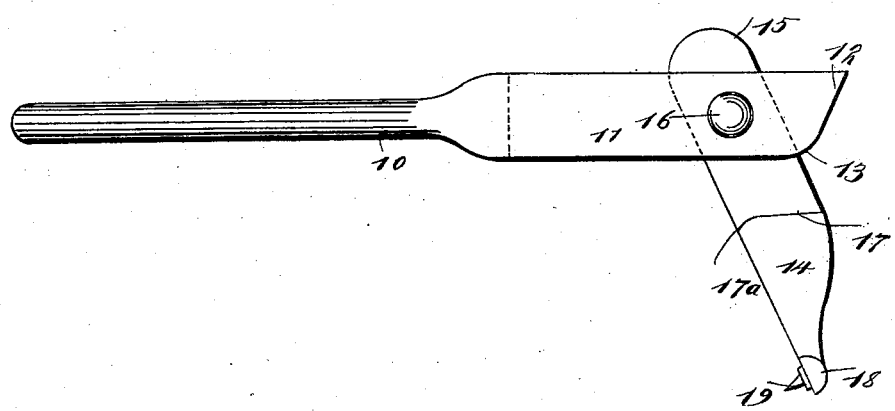
WITNESSES:
INVENTOR
BY
ATTORNEYS

UNITED STATES PATENT OFFICE.

WILLIAM P. NEGUS, OF WEST BRANCH, IOWA.

WIRE-STRETCHER.

SPECIFICATION forming part of Letters Patent No. 513,816, dated January 30, 1894.

Application filed October 30, 1893. Serial No. 489,484. (No model.)

*To all whom it may concern:*

Be it known that I, WILLIAM P. NEGUS, of West Branch, in the county of Cedar and State of Iowa, have invented a new and Improved Wire-Stretcher, of which the following is a full, clear, and exact description.

My invention relates to improvements in that class of devices which are used for stretching fence wires.

My invention is particularly adapted for stretching wires close to the posts of the fence, and for this reason the wire stretcher may be used in connection with other forms of devices which are adapted to stretch the main body of the fence wire but which cannot stretch the wire close to the post to which the wire is secured.

The object of my invention is to produce an extremely simple device which is very inexpensive, durable and strong, which is adapted to be used in the manner specified above, which may be quickly and securely clamped to a wire and fastened to a post, and by which any form of wire may be quickly and thoroughly stretched.

To these ends my invention consists of a wire stretcher, the construction of which will be hereinafter described and claimed.

Reference is to be had to the accompanying drawings forming a part of this specification, in which similar figures of reference indicate corresponding parts in all the views.

Figure 1 is a front elevation of the wire stretcher embodying my invention. Fig. 2 is a plan view of the stretcher as applied to a wire and post, the post being shown in section and the stretcher being clamped to the wire; and Fig. 3 is a plan view of the open stretcher.

The stretcher is provided with a handle lever 10, which is bifurcated at one end, and the prongs 11 of the fork thus formed terminate in inclined ends 12 which, on one corner, are slightly rounded, as shown at 13, to enable the wire to be easily inserted in the stretcher, as hereinafter described, and also to provide for the free swinging of the clamping dog. The dog 14, which is adapted to clamp the wire to the ends of the fork prongs, is provided with a shank 15 which is held between the prongs 11 and is hung on a pivot pin 16, so that the dog may swing downward or inward, as shown in Fig. 3. The dog 14 has shoulders 17 which are slightly inclined so as to lie against the inclined ends of the fork prongs, and these shoulders are slightly rounded at one corner, as shown at $17^a$, these rounded portions coming opposite the rounded corners of the fork prongs, and they enable the wire to be easily placed in position on the shoulders and also prevent the wire from being cut when a strain is applied to it, as described below. The dog 14 has at its outer end a cross piece 18 which is flat on one side, the flat face being flush with the adjacent flat edge of the dog 14, and on this flat face of the cross piece are projecting teeth 19 which are adapted to be embedded in the post 20 when the stretcher is applied to the post and to a wire 21.

When the stretcher is used, the dog 14 is tilted into a position at an angle to the lever 10 and its prongs 11, as shown clearly in Fig. 3, the wire 21 is placed on the upper side of the dog so as to lie between the end of one of the prongs 11 and the opposite shoulder 17 of the dog, and the teeth of the dog are placed against one side of the post, the side opposite the wire as shown in Fig. 2. After this the lever is swung around on the post and it causes the dog to come into position in alignment with the lever, as shown in Fig. 2, and then by continuing the pressure on the lever, the wire is stretched tight and may be fastened by a staple in the usual way.

Having thus described my invention, I claim as new and desire to secure by Letters Patent—

1. A wire stretcher, comprising a forked lever, the prongs of which have inclined ends, and a dog pivoted between the prongs, the dog having inclined shoulders opposite the ends of the prongs, and teeth at its outer end, substantially as described.

2. A wire stretcher, comprising a forked lever, the prongs of which have inclined ends, a dog pivoted between the prongs and provided with shoulders adapted to swing opposite the inclined ends of the prongs, and a toothed cross piece on the free end of the dog, substantially as described.

WILLIAM P. NEGUS.

Witnesses:
WM. BREMNER,
GEO. HEPPENSTALL.